June 30, 1959   K. W. MOZUR   2,892,260
LEVELLING DEVICE
Filed Sept. 7, 1956
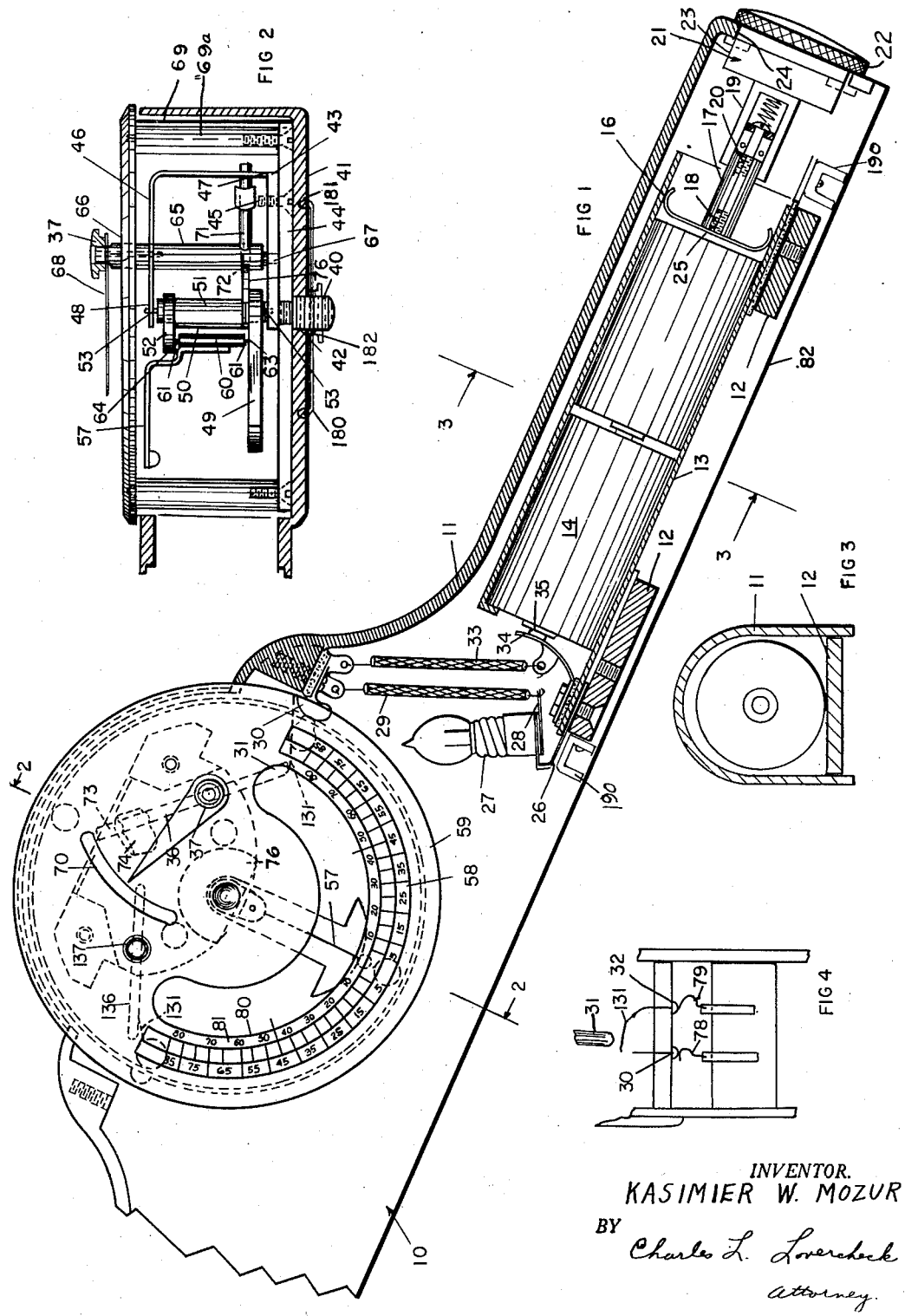
INVENTOR.
KASIMIER W. MOZUR
BY Charles L. Lovercheck
Attorney.

United States Patent Office 2,892,260
Patented June 30, 1959

2,892,260

LEVELLING DEVICE

Kasimier W. Mozur, Erie, Pa.

Application September 7, 1956, Serial No. 608,487

2 Claims. (Cl. 33—221)

This invention relates to instruments and more particularly to levelling instruments.

Levelling instruments made according to previous designs have usually been made of an elongated body having an arcuate shaped tube made of transparent material with a bubble of air therein. The bubble of air will move along the arcuate tube in accordance with the attitude of the body member and, therefore, indicates when the body is in level position and indicates the attitude of the surface being inspected. Another way of determining levels is by use of a plumb line and bob. The tube and bubble instrument has limited utility and will not check relative angles and the plumb bob cannot be used to check a surface.

It is, accordingly, an object of this invention to provide a levelling instrument which is simple in construction, economical to manufacture, and simple and efficient to use.

Another object of the invention is to provide an improved instrument with accuracy and degree for determining the angular relationship between a given surface and a horizontal plane and, also, a vertical plane.

A further object of this invention is to provide a levelling instrument which utilizes a pendulum and a calibrated scale for determining angular relationships between a given plane and a horizontal plane as well as a vertical plane.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a longitudinal cross sectional view of a levelling instrument according to the invention;

Fig. 2 is a cross sectional view taken on line 2—2 of Fig. 1;

Fig. 3 is a cross sectional view taken on line 3—3 of Fig. 1; and

Fig. 4 is an enlarged view of the switching arrangement of the device.

Now with more specific reference to the drawings, a levelling instrument is shown having a body 10 which may be made of molded plastic material or any other suitable material. The body 10 has a top portion 11 which is generally channel shaped as shown in Fig. 3. The body 10 also has spaced transverse closure members 12 which support a cartridge 13 at each end thereof for receiving batteries 14. The batteries 14 are engaged at the rear end thereof by means of a resilient terminal 16 which is attached to an insulating member 17 by means of screws 18. The insulating member 17 is in turn attached to a support 19 by means of screws 20. The insulating member 17 is telescopically slidable in the member 19. The support 19 is supported on a plug 21 which has a knurled hand engaging handle 22 and a reduced size portion 23 which frictionally engages an opening 24 in the end of the body 10.

The terminal 16 engages the cartridge 13 and forms an electrical contact therewith. A screw 25 engages the metal casing portion of the battery cells 14 and forms a contact to conduct current to a terminal 26 which engages the base of a bulb 27. The other terminal of the bulb 27 is engaged by a terminal 28 which provides an electrical circuit through a spring 29 to a terminal 30, then through a switch 31 on a lever 71 to a terminal 32, then through a spring 33 to a terminal 34, and then to the positive terminal of a battery 35. A lever 36 is attached to and rotated by means of a handle 37 to bring the lever 71 into contact with the terminal 30 and the switch 31. This will urge a spring end 131 into engagement with the terminal 30 when the members 30 and 31 are closed and complete a circuit through the batteries 14 and through the lamp bulb 27, thereby causing it to glow.

The inside of the body 10 has a transparent sheet of plastic material 69 disposed around the inner graduated working dial. The graduated portion of the dial may be transparent while the upper half or non-graduated part of the dial will be non-transparent.

The operating part of the levelling device, an indicating mechanism thereof, is shown in Fig. 2. A bearing member 40 threadably engages a back 41 of the body 10 at 42 and extends through a plate 43. The plate 43 is attached to a plate 44 by means of a screw 45. A bracket 46 is attached to the plate 43 at 47. The bracket 46 extends forwardly and downwardly to form a sensitive low resistance jewelled bearing support 48. A pendulum 49 is attached to an assembly 50 which is made up of an axle 51 having the pendulum 49 attached thereto at one end and a depending bracket 52 attached thereto at the other end with bearing pins 53 attached to either end of the axle 51 and engaging jewelled bearings in the plate 43 and the bracket 46. A fine indicator 57 for reading graduations 58 on a dial 59 is supported on an axle 60 which has jewelled bearings 61 at each end thereof. The bearings 61 engage jewelled bearings 63 and 64 in the bracket 52 and the pendulum 49, respectively.

The plate 44 and the dial 59 are held together by posts 69a and constitute a drum. The plate 44 is attached to the bearing member or screw 40. The screw 40 extends through the back 41 and has a hole therethrough receiving a rod 180. The ends of the rod 180 are turned in and are adapted to engage notches 181 disposed at spaced positions one hundred eighty degrees apart on the back 41. Therefore, by loosening a nut 182, the ends of the rod 180 will move out of the notches 181 and the drum can be rotated one hundred eighty degrees. This makes it possible to apply the instrument to ceilings, etc.

An axle 65 is journalled in the dial 59 at 66 at one end thereof and the axle 65 is journalled in the plate 43 at 67 at the other end thereof. A band 68 is clamped to the axle 65 by means of the handle nut 37 and rotates therewith to indicate the position of the hand 68 on a dial strip 70. The lever 71 is fixed to the axle 65 at 72 and rotates therewith. An end 73 of the lever 71 has a cam 74 which is adapted to swing therewith into engagement with a cam 76 which is fixed to the axle 51. The other end of the lever 36 is adapted to engage contacts 78 and 79 to close the circuit to the bulb 27. The dial 59 has a slot 80 therein. The outer edge of the slot 80 is calibrated at 81 in degrees to an angle of ninety degrees at each side of the zero position.

When the instrument is not in use, the operator will rotate the handle 37 to bring the cam 74 into engagement with the cam surface 76 to lock the pendulum 49 in fixed position for storage. Then when he desires to operate the instrument, the operator will rotate the handle 37 to bring the indicator 57 to the intermediate position shown and released from the locking point. This will remove the cam 74 from the cam 76 and will allow the pendulum 49 to be free to indicate a given level. If the operator is working in a dark place and desires to have the dial 59 illuminated by a light, he will rotate the handle 37 still further, thereby bringing the end of the lever 36 into contacting relationship with the switch 31 and causing the bulb 27 to light. He will then lay the surface 82 of the instrument onto the surface to be checked and the pendulum 49 will swing to a vertical position perpendicular to a horizontal plane and the fine hand indicator 57 will swing to the vertical position likewise. The pendulum 49 will tend to oscillate since it will have a pendulum effect; however, the fine hand 57, being of very low inertia and very sensitive, will seek its vertical position and will stay in this position without hunting. The operator can then read the angular displacement of the plane being checked to the horizontal vertically and upside down by checking the point at which the fine hand 57 is opposite on the calibrated scale portion 58.

A similar light to the light 27 may be supported on the opposite side of the dial 59 and batteries similar to the batteries 14 may be installed in a symmetrical half of the level. Then a switch rod 136 may be operated by a handle 137 to control the other light. When the drum is rotated one hundred eighty degrees, the levers 36 and 137 will each operate the switch on the other side.

In order to provide a means for holding the level to an iron surface to be inspected, magnets 190 are attached to the closure members 12. Therefore, when the level is laid against an iron surface, it will be held there while the operator reads the scale 58.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A levelling instrument comprising a body, a bracket extending outwardly and downwardly from said body when inside thereof, a jewelled bearing in said bracket, another jewelled bearing in said body in alignment with said bearing in said bracket, a pendulum journalled between said jewelled bearings, a jewelled bearing on said pendulum, a fine indicator member pivotally supported in said jewelled bearing on said pendulum, a dial on said instrument, said dial having a scale thereon, said fine indicator member being adapted to swing along said scale on said dial, a switch member having a handle thereon extending through said dial, and a brake member on said switch member adapted to engage a locking device on said pendulum to hold said pendulum against swinging, said switch member having an intermediate position whereat said locking device is disengaged, said switch member having a third position whereat a light is turned on and said locking device is disengaged.

2. A levelling instrument comprising a body, a bracket extending outwardly and downwardly from said body when inside thereof, a drum rotatably supported in said body and having means to fix said drum selectively in one of two positions disposed one hundred eighty degrees apart, said drum being made of a plate rotatably supported on said body, posts extending upwardly from said plate, a dial attached to said posts at a point spaced from said plate, a pendulum supported on jewelled bearings in said drum, said drum having a transparent sheet of material disposed therearound, a light source in said body outside of said drum, a switch member having a handle extending through said dial, said switch member being disposed in said drum and adapted to engage contact members to complete a circuit to said light source, an indicating hand on said switch member, and means to indicate when said switch member is in an on or an off position, said switch member having means thereon to engage a cam member on said pendulum to lock said pendulum in a fixed position.

References Cited in the file of this patent

UNITED STATES PATENTS

| 9,722 | Chandler | May 17, 1853 |
| 592,833 | Sanders | Nov. 2, 1897 |
| 1,844,762 | Hilton | Feb. 9, 1932 |
| 2,220,029 | Stephan | Oct. 29, 1940 |
| 2,611,189 | Bello | Sept. 23, 1952 |
| 2,624,954 | Watkins | Jan. 13, 1953 |
| 2,775,044 | Beebout | Dec. 25, 1956 |